United States Patent
Koo et al.

(10) Patent No.: US 8,665,338 B2
(45) Date of Patent: Mar. 4, 2014

(54) BLURRED IMAGE DETECTION FOR TEXT RECOGNITION

(75) Inventors: Hyung-Il Koo, Seoul (KR); Taesu Kim, Seoul (KR); Ki-Hyun Kim, Daejeon (KR); Te-Won Lee, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 291 days.

(21) Appl. No.: 13/039,875

(22) Filed: Mar. 3, 2011

(65) Prior Publication Data

US 2012/0224072 A1    Sep. 6, 2012

(51) Int. Cl.
*H04N 5/228* (2006.01)

(52) U.S. Cl.
USPC ............ 348/208.1; 348/208.2; 348/208.4; 348/208.7; 348/206.99

(58) Field of Classification Search
USPC ........ 348/208.1, 208.2, 208.4, 208.7, 208.99
See application file for complete search history.

(56) References Cited

U.S. PATENT DOCUMENTS

| | | | |
|---|---|---|---|
| 3,690,234 A | 9/1972 | Costianes | |
| 7,343,049 B2 * | 3/2008 | Butterworth | 382/284 |
| 7,564,482 B2 | 7/2009 | Clarke et al. | |
| 7,688,352 B2 | 3/2010 | Nomura et al. | |
| 7,982,770 B1 * | 7/2011 | Kahn et al. | 348/208.1 |
| 2003/0151672 A1 | 8/2003 | Robins et al. | |
| 2004/0130628 A1 | 7/2004 | Stavely | |
| 2006/0015337 A1 | 1/2006 | Kurzweil et al. | |
| 2007/0098379 A1 | 5/2007 | Wang et al. | |
| 2008/0002916 A1 | 1/2008 | Vincent et al. | |
| 2008/0101786 A1 | 5/2008 | Pozniansky et al. | |
| 2009/0174782 A1 | 7/2009 | Kahn et al. | |
| 2010/0091113 A1 | 4/2010 | Morioka et al. | |

FOREIGN PATENT DOCUMENTS

| | | |
|---|---|---|
| EP | 2410465 A1 | 1/2012 |
| WO | WO2008129374 A2 | 10/2008 |

OTHER PUBLICATIONS

International Search Report and Written Opinion-PCT/US2012/027721-ISA/EPO-Apr. 10, 2012.
Uchida et al., "Mosaicing-by-recognition for video-based text recognition," Pattern Recognition 41 (2008), The Journal of the Pattern Recognition Society, Aug. 16, 2007, Elsevier Ltd., pp. 1230-1240 (www.elsevier.com/locate/pr).

* cited by examiner

*Primary Examiner* — Yogesh Aggarwal
(74) *Attorney, Agent, or Firm* — Jennifer M. Pascua

(57) ABSTRACT

Techniques are described for identifying blurred images and recognizing text. One or more images of text may be captured. A change of movement associated with each image of the one or more images may be calculated. The change of movement associated with an image of the one or more images represents a change in an amount of acceleration of the device used to capture the image while the image was being captured. A steady image may be selected from the one or more images to use for text recognition. The steady image can be selected using the variances of acceleration associated with each image of the one or more images.

18 Claims, 7 Drawing Sheets

BLURRED IMAGE DETECTION FOR TEXT RECOGNITION

BACKGROUND

In various situations, it is useful to convert text to machine-encoded text. Oftentimes, to perform optical character recognition, a page containing printed text is electronically captured using a flatbed scanner, mounted camera, or some other equivalent device. The electronically captured image of the printed page is processed to create machine-encoded text that is an accurate representation of the information contained in the printed text. However, in some circumstances, the printed text is not scanned using a fixed position device. Rather, a handheld device, such as a camera, is used to capture an image of the text that is to be converted to machine-encoded text. The use of a handheld device to capture images can result in blurred pictures. This blurring is often due to unintentional movement of a user's hand, arm, and/or body while the user is attempting to hold the handheld device still at the time an image is being captured. As the amount of time to capture an image increases (e.g., the longer the camera's shutter is open), the amount of blurring in the image can be expected to increase. While some techniques for reducing blur in captured images exist, these techniques tend to require significant computing power and can be difficult to execute efficiently on a handheld device due to factors such as the device's processing capabilities and its power source.

SUMMARY

In some embodiments, a system for recognizing text is presented. The system may include an image capture device configured to capture one or more images. Each image of the one or more images may comprise text. A movement measurement device may be configured to measure movement of the image capture device. A processor may be configured to determine, using the movement measurement device, a change of movement value associated with each of the one or more images. Each change of movement value represents a change in an amount of movement of the image capture device while a corresponding one of the one or more images was being captured. The processor may also be configured to select a particular image from the one or more images to use for text recognition. The particular image may be selected using the change of movement value associated with each image of the one or more images.

The processor may be further configured to perform text recognition on at least some of the text of the particular image. The processor may be further configured to determine whether the particular image is desirable to use for text recognition. The processor may be further configured to select the particular image from the one or more images to use for text recognition based on the change of movement value associated with the particular image being less than a threshold change of movement value. The processor may be further configured to select the particular image from the one or more images to use for text recognition based on the change of movement value associated with the particular image having the smallest magnitude as compared with the change of movement values associated with other images of one or more images and the one or more images comprise at least two images. The processor, the image capture device, and the movement measurement device may be part of a cellular phone. The image capture device may be selected from a group consisting of: a still camera; and a video camera. The movement measurement device may be selected from a group consisting of: an accelerometer; and a gyroscope. The movement measurement device may be an acceleration measurement device; and the change of movement values associated with each of the one or more images may be variances of acceleration values.

In some embodiments, a method for capturing sharper images is presented. The method may include capturing, by a computerized device, one or more images. The method may also include determining, by the computerized device, a change of movement value of the computerized device associated with each image of the one or more images. Each change of movement value may represent a change in an amount of movement of the computerized device while a corresponding one of the one or more images was being captured. The method may also include selecting, by the computerized device, a particular image from the one or more images. The particular image may be selected using the change of movement value associated with each image of the one or more images.

The method may further include determining whether the particular image is desirable to use for text recognition, wherein the one or more images comprises text. Selecting the particular image from the one or more images may be based on the change of movement value associated with the particular image being less than a threshold change of movement value. The computerized device may include an accelerometer. The computerized device may include a cellular phone. The one or more images include at least two images. Each change of movement value may be a variance of acceleration value. The computerized device may comprise an image capture device used to capture the one or more images, the image capture device selected from a group consisting of: a still camera; and a video camera.

In some embodiments, an apparatus for capturing a steady image is presented. The apparatus may include means for capturing one or more images. The apparatus may include means for detecting movement of the means for capturing the one or more images. The apparatus may include means for determining a change of movement value associated with each image of the one or more images. Each change of movement value may represent a change in an amount of movement of the means for capturing the one or more images while a corresponding one of the one or more images was being captured. The apparatus may include means for selecting a particular image from the one or more images. The particular image may be selected using the change of movement value associated with each image of the one or more images.

The apparatus may include means for performing text recognition on text of the particular image. The particular image may be selected from the one or more images to use for text recognition based on the change of movement value associated with the particular image being less than a threshold change of movement value. While the image capture device is capturing each image of the one or more images, a person may be holding the means for capturing the one or more images and the person is attempting to hold the means for capturing the one or more images stationary. The particular image may be selected from the one or more images to use for text recognition based on the change of movement value associated with the particular image having the smallest magnitude as compared with the change of movement values associated with other images of the one or more images. The one or more images may include at least two images.

In some embodiments, a computer program product residing on a non-transitory processor-readable medium and comprising processor-readable instructions is presented. The instruction may be configured to cause a processor to induce a set of one or more images to be captured. The instruction may be configured to cause the processor to determine a change of movement value associated with each image of the one or more images. Each change of movement value may represent a change in an amount of movement of an image capture device while a corresponding one of the one or more images was being captured by the image capture device. The instruction may also be configured to cause the processor to select a particular image from the one or more images. The particular image may be selected using the change of movement value associated with each image of the one or more images.

The instruction may be further configured to cause the processor to comprising processor-readable instructions configured to cause the processor to perform text recognition on text of the particular image. The instruction may be further configured to cause the processor to use acceleration measurements to determine each change of movement value associated with each image of the one or more images. The instruction may be further configured to cause the processor to select the particular image from the one or more images to use for text recognition based on the change of movement value associated with the particular image being less than a threshold change of movement value. The instruction may be further configured to cause the processor to select the particular image from the one or more images based on the change of movement value associated with the particular image having the smallest magnitude as compared with the change of movement values associated with other images of the one or more images, wherein the one or more images comprises at least two images.

DETAILED DESCRIPTION

Figure 1:
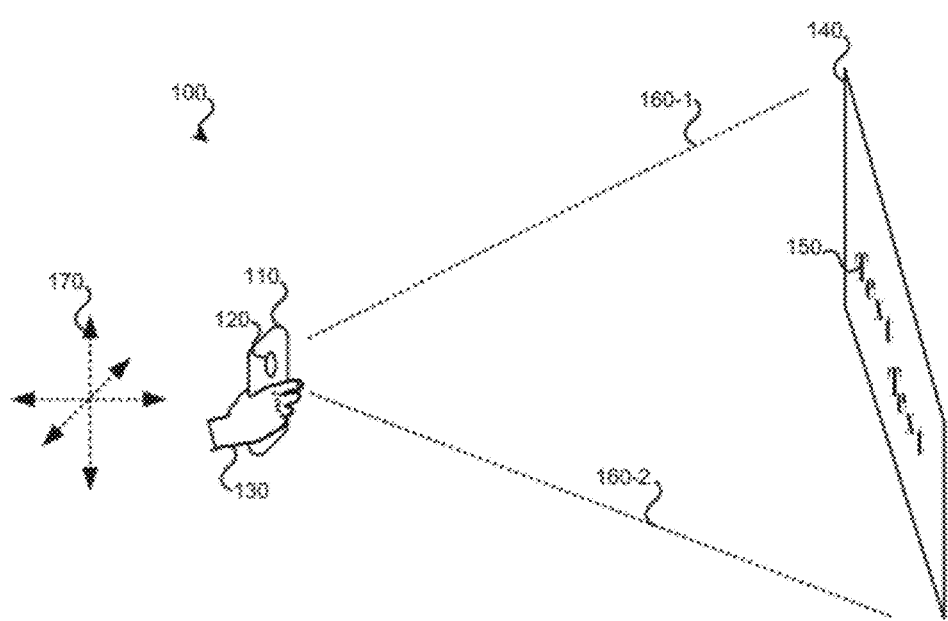
FIG. 1 illustrates an embodiment of an image capture device being used to capture an image of text.

Rather than attempting to reduce or eliminate the blurring in an image captured by a handheld image capture device, images may be captured until a sharp image is captured while the image capture device is held sufficiently motionless. By using changes in movement, such as variances in acceleration, it can be determined with a good probability whether an image will be sufficiently sharp for text present in the image to be converted to machine-encoded text. In order to obtain a sufficiently sharp image, one or more images may be captured until the change in movement of the image capture device at the time the image is captured is below a threshold value. In some configurations, multiple images are captured and variance of acceleration values are associated with each image. The image associated with the smallest variance in acceleration (or, more generally, the smallest change in movement value) may be considered as likely having the least amount of blurring. This steady image can be used for text recognition or for some other purpose, such as imaging a barcode, taking a sharp picture, or recognizing an object.

Using a sharp image for text recognition or some other form of image processing can be more efficient than processing a blurry image to make it sharper because less computing power may be used to capture multiple frames and select a sharp frame than process either a de-blurring algorithm that creates a clean image from a blurred image or perform an image-based motion detection process that detects motion by analyzing pixel movement between images taken in succession. Using either a de-blurring algorithm or an image-based motion detection process can be computationally demanding, and thus may take too long and/or consume too much power if executed on a handheld device that has a relatively slow processor and/or is powered by a battery.

In various categories of handheld devices, such as cellular phones (including smart phones), still cameras, webcams, and video cameras, movement measuring devices are incorporated to measure motion. These devices, such as accelerometers, are likely to be fairly inaccurate in determining the acceleration and/or velocity of the handheld device. While the acceleration and/or movement measured by a movement measuring device may not be suitably accurate, these same movement measuring devices may provide acceptably accurate changes in movement (e.g., variances in acceleration). While a device with no change in movement or variance in acceleration may be accelerating at a constant rate, in practice if the device is handheld and the variance in acceleration is roughly zero, the device is likely stationary and can be considered to be roughly motionless.

Therefore, rather than attempting to remove some or all of the blurring in a single image captured by a handheld device, one or more images may be captured by the handheld device until an image is captured when the change in movement of the handheld device is at or below a threshold value. This image is processed to convert text in the image to machine-encoded text. While the configurations described herein focus on text recognition, similar techniques can be used to capture information besides text, such as barcodes, pictures, symbols, or other visually-displayed information.

FIG. 1 illustrates an embodiment 100 of an image capture device 120 being used to capture text 150 that is to be converted to machine-encoded text. Image capture device 120 can be a still camera configured to capture only still images. Image capture device 120 can also be a video camera that is configured to capture frames (e.g., images) in rapid succession to be played back as video. Image capture device 120 can also be capable of functioning as both a still camera and a video camera. In some configurations, image capture device 120 is a standalone device, such as a dedicated still camera or video camera. In other configurations, image capture device 120 is incorporated as part of a computerized device, such as cellular phone 110. Cellular phone 110 and image capture device 120 are handheld by a user. A user's hand 130 is illustrated as holding cellular phone 110. Typically, despite the user's efforts to hold cellular phone 110 motionless while an image is being captured, natural movement of the user's hand, arm, and/or body, results in some motion of cellular phone 110. This natural movement can result in movement in any three dimensional direction, as illustrated by imaginary dotted arrows 170.

In embodiment 100, the user is attempting to capture an image of text 150 (which reads "Text Text"). Text 150 is present on surface 140. Surface 140 can represent any surface displaying text that a user may wish to capture. For example, surface 140 may be a billboard, sign, advertisement, digital display, television screen, book, magazine, newspaper, or part of a vehicle. Of course, many other surfaces displaying text are also possible. In order to capture text 150, the user may hold (with hand 130) cellular phone 110 and aim image capture device 120 at text 150. The field of view of image capture device 120 is illustrated by dotted lines 160-1 and 160-2. In some instances, such as if surface 140 is a book, cellular phone 110 is held at a small distance, such as one foot, from surface 140. In other instances, such as if surface 140 is a roadside billboard, cellular phone 110 is held at a greater distance, such as fifty feet, from surface 140. In conjunction with the movement of the user, factors such as distance, amount being used, ambient lighting conditions (which can affect how long image capture device 120 requires to capture an image), and quality of image capture device 120 can influence the amount of blurring in images captured of text 150.

Cellular phone 110 (or image capture device 120) may contain other components not illustrated. For example, an accelerometer may be incorporated as part of cellular phone 110. When one or more images of text 150 are captured by image capture device 120, an accelerometer or other movement measurement device may measure the acceleration (or, more generally, the movement) of the image capture device 120 and/or cellular phone 110 at the time each of the one or more images is captured. Rather than directly using an accelerometer's measured amount of acceleration (or some other unit of movement measured by a movement measurement device), which can be inaccurate, the variance in acceleration (or other change in movement value) is computed using the measured amounts of acceleration (or measured amounts of movement) and is used to determine whether a captured image is likely to be sharp enough for text recognition. As such, blurred images are detected and not used for text recognition.

Figure 3:
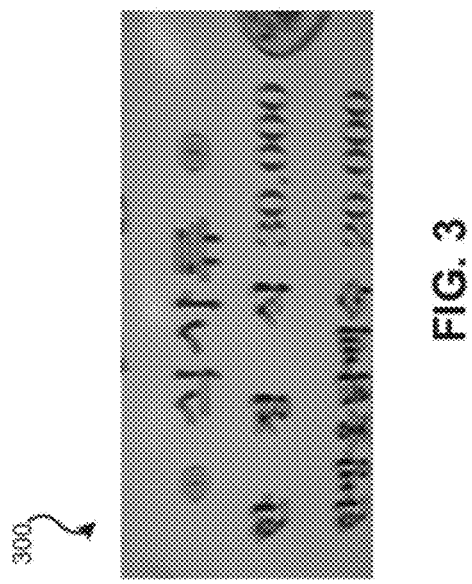
FIG. 3 illustrates the sample piece of text of FIG. 2 captured with a higher variance of acceleration than during capture of the text illustrated in FIG. 2.
Figure 2:
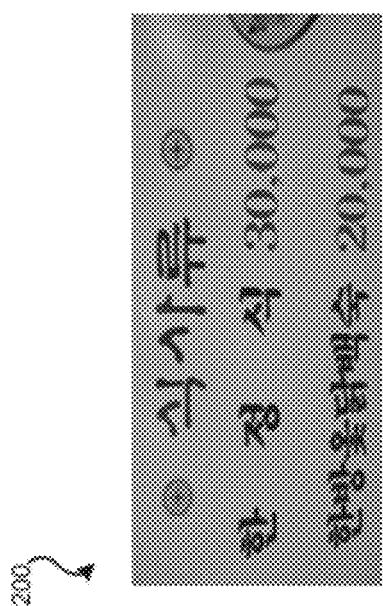
FIG. 2 illustrates a sample piece of text captured with a low variance of acceleration.

FIG. 2 illustrates a sample piece of text captured by an image capture device with a low variance of acceleration. As can be seen, the text of Korean characters and Arabic numerals appears sharp in captured image 200. However, in FIG. 3, this is not the case. FIG. 3 illustrates the same piece of text of FIG. 2 captured by an image capture device with a higher variance of acceleration. Here, the text of Korean characters and Arabic numerals appear blurred in captured image 300.

Figure 4:
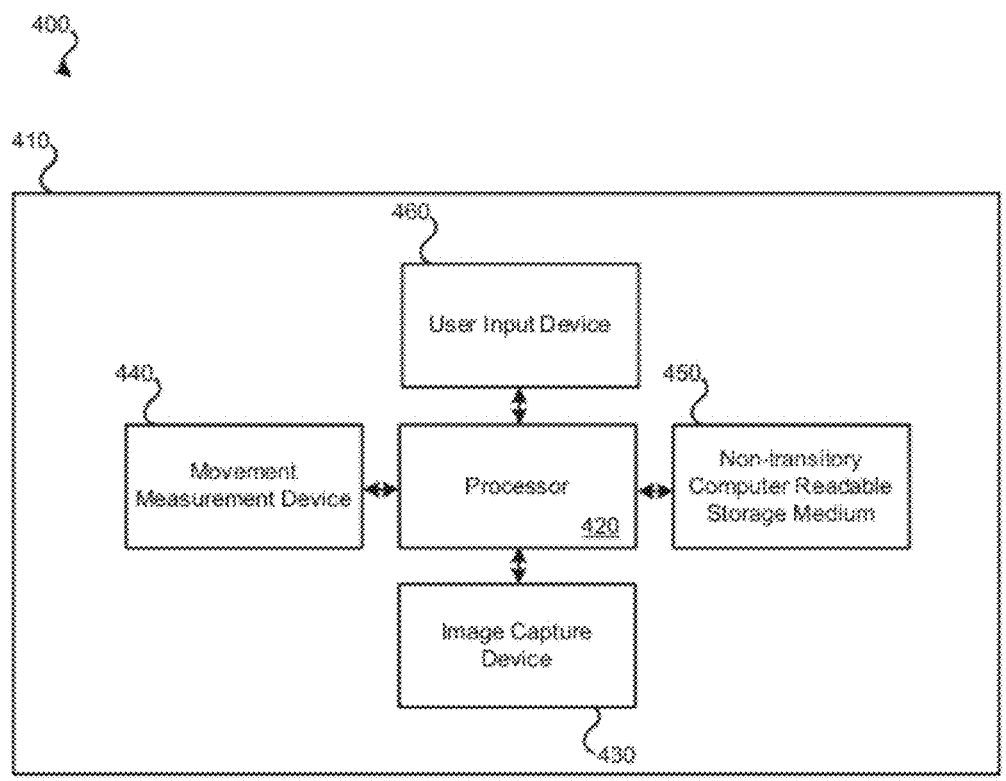
FIG. 4 is a simplified system block diagram of a device capable of blurred image detection.

FIG. 4 illustrates a block diagram of an embodiment 400 of a computerized device 410 capable of blurred image detection. Computerized device 410 may be a cellular phone, still camera, video camera, webcam, or some other handheld device capable of capturing an image. Computerized device 410 may include: processor 420, image capture device 430 (which may represent image capture device 120 of FIG. 1), movement measurement device 440, non-transitory computer-readable storage medium 450, and user input device 460.

When a user wishes to capture text and for it to be converted into machine-encoded text, the user holds and points image capture device 430 of computerized device 410 at the text to be converted. Once the text is present in the field of view of image capture device 430, the user provides an input to computerized device 410 via user input device 460. User input device 460 is a button (e.g., a physical button or a soft button, which may be a location on a touch screen designated to function as a button), switch, or voice-activated device. In some configurations, user input device 460 is some other form of trigger that a user can use to indicate that text is to be captured and converted to machine-encoded text.

Processor 420 receives input from user input device 460. Processor 460 can be a general purpose processor or a specialized processor. After receiving a signal from user input device 460, processor 460 sends a signal to image capture device 430 to instruct it to capture one or more images. In some configurations, user input device 460 directly triggers image capture device 430. Upon receiving a signal from processor 420, image capture device captures a predefined number of images or may capture images until instructed otherwise by processor 430. As discussed in relation to image capture device 120, image capture device can be a still camera, video camera, or both.

For each image captured by image capture device 430, a measurement by movement measurement device 440 is taken. As such, one or more measurements of movement, such as acceleration measurements, are associated with each image captured by image capture device 430. These measurement(s) of movement are transmitted from movement measurement device 440 to processor 420. At least partially based on the received movement measurements from movement measurement device 440, processor 420 calculates the change in movement (such as the variance in acceleration) of the image capture device 430 (which is the change of movement of the movement measurement device 440 and computerized device 410 assuming they are packaged together). Once an image associated with an acceptably low change in movement has been captured, processor 430 may signal to image capture device 430 to cease capturing images or may not instruct image capture device 430 to capture additional images. Similarly, processor 430 may signal to movement measurement device 440 to cease additional measurements.

Some or all of the images captured by image capture device 430 are, at least temporarily, stored in non-transitory computer-readable storage medium 450. Similarly, the associated movement, change in movement, acceleration and/or variance in acceleration calculations are stored using non-transitory computer-readable storage medium 450. In some configurations, non-transitory computer-readable storage medium 450 is random access memory, flash memory, or a hard drive. Non-transitory computer-readable storage medium 450 also stores software executable by processor 420 to perform tasks such as determining the variance in acceleration, determining which images are likely to be blurry, determining which images are likely sharp enough for text recognition, and performing text recognition.

While computerized device 410 contains components to capture images, measure changes in movement, store data, and perform text recognition, other components are also present. For example, if computerized device 410 is a cellular phone, components to perform wireless communication functions, such as web browsing, data transfer, phone calls, and text messaging are present.

Figure 5:
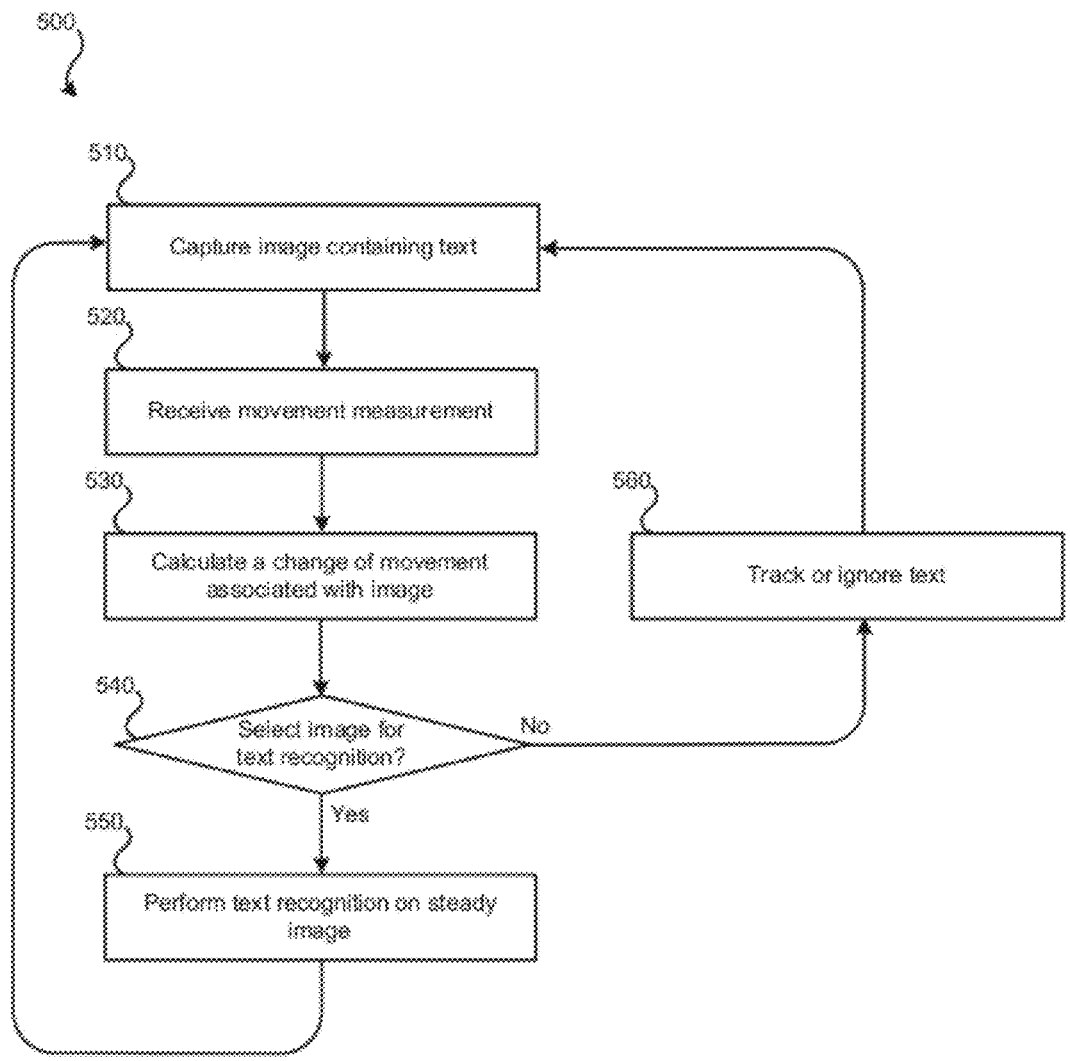
FIG. 5 is a block flow diagram of a method for blurred image detection.

FIG. 5 illustrates an embodiment of a method for blurred image detection. At stage 510, an image containing text that is to be converted to machine encoded text is captured by an image capture device, such as image capture device 120 or image capture device 430. While the image is being captured, a user holding the image capture device (or holding the device that contains the image capture device) is likely attempting to hold the image capture device stationary (with respect to the text being captured) to reduce blurring. While the user is attempting to hold the image capture device stationary, some amount of movement is expected due to natural motion of the user's hand, arm, and body.

At stage 520, one or more movement measurements are taken at the same time, or roughly the same time, as when the image was captured at stage 510. The movement measurement(s) are made by a movement measurement device, such as an accelerometer or a gyroscope. The movement measurements may be measurements of acceleration or velocity.

At stage 530, a change in movement associated with the image captured at stage 510 is calculated using the movement measurement(s) taken at stage 520. In some embodiments, these change in movement calculations are variances of acceleration. To determine the variance of acceleration, equation 1 is used.

$$M(t) = \frac{1}{N} \sum_{n=t-N+1}^{t} \left| a(n) - \frac{1}{N} \sum_{k=t-N+1}^{t} a(k) \right|^2 \quad \text{Eq. 1}$$

In equation 1, M(t) indicates the variance of acceleration of the acceleration measurement device, which is coupled with the image capture device. Therefore, the greater the value of M(t), the more the image capture device is determined to be moving. The acceleration at time t is defined according to equation 2:

$$a(t) \epsilon R^2 \quad \text{Eq. 2}$$

Using equation 1, the variance of acceleration is calculated in current time frame (t−N+1:t) where equation 3 (which is a portion of equation 1) represents the average acceleration at time (t−N+1:t).

$$\frac{1}{N} \sum_{k=t-N+1}^{t} a(k) \quad \text{Eq. 3}$$

Determining the motion of the image capture device using variances in acceleration, rather than acceleration measurements from an acceleration measurement device, may allow for the magnitude of motion of the image capture device to be determined more accurately.

At stage 540, the image may or may not be selected for text recognition. In some configurations, the image is selected for text recognition if the value of M(t) is less than a predefined threshold value. If M(t) is not less than the threshold value, method 500 proceeds to stage 560. At stage 560, recognition of text (or any other symbol or object) present in the image captured at stage 510 is not attempted. In some configurations, the text (or other symbol or object), although not being converted to a machine-encoded format, is tracked. Method 500 then returns to stage 510 to capture another image and repeat method 500. Since the user is expected to be attempting to hold the image capture device stationary, it can be expected that the same, or mostly the same, text will be imaged each time stage 510 is executed until stage 550 has been performed. Method 500 may repeat through these stages until an image is determined to have an M(t) value below the predefined threshold value. In some configurations, if an M(t) value below the predefined threshold value is not obtained within a predefined period of time, method 500 aborts without text recognition (or recognition of any other symbol or object) being performed.

If M(t) is less than the threshold value, method 500 proceeds to stage 550. At stage 550, text recognition is performed using the image that has been determined to have been captured while the image capture device was held steady. The machine-encoded text is then output to some other device or piece of software. If necessary, following the text being converted to machine-encoded text, the method returns to stage 510 to capture additional images for other text or in case the text conversion fails. In some configurations, method 500 ends after stage 550. If method 500 ceases, the image capture device may be instructed to cease capturing images.

While method 500 discusses a steady image being captured for text recognition, a steady image may be captured for some other reason. For example, a steady image of many other non-textual entities may be desired. For example, a steady image of a person, object, barcode, art, or location are only a few possible examples.

Figure 6:
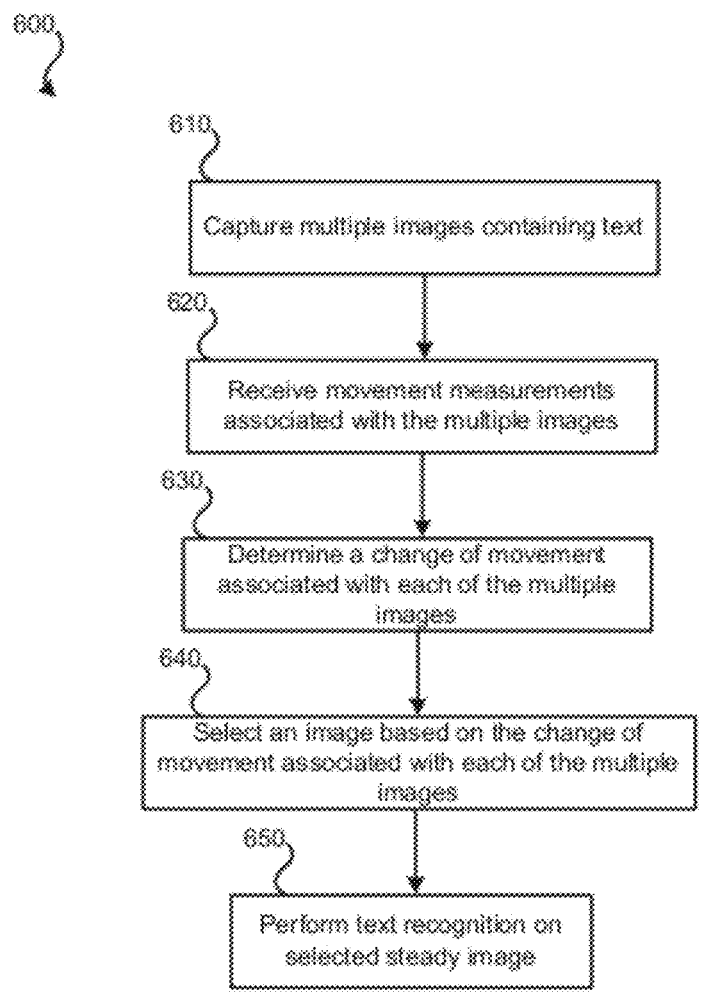
FIG. 6 is a block flow diagram of another method for blurred image detection.

In method 500, if the user is holding the image capture device sufficiently still, the first image captured of the text might have a low enough associated M(t) that a second image does not need to be captured. In some configurations, multiple images are always captured. For example, FIG. 6 illustrates an embodiment of method 600 for blurred image detection for text recognition that results in at least two images being captured whenever the method is executed. At stage 610, two or more images containing the text the user wishes to convert to machine-encoded text are captured and at least temporarily stored. These images are captured in short succession, such as a tenth of a second, a half of a second, or a second apart.

At stage 620, movement measurements are taken at the same times, or roughly the same times, as when the images were captured at stage 610. Therefore, for each image captured at stage 610, one or more associated movement measurements are made at the time the image was captured. The one or more movement measurements are made by a movement measurement device, such as an accelerometer or a gyroscope. The movement measurements may be acceleration measurements.

At stage 630, the change in movement associated with each of the multiple images is calculated. The change in movement, may be a variance in acceleration, which can be calculated as previously described in relation to equations 1 through 3, is performed at stage 630 for each captured image.

At stage 640, using the values of M(t) calculated for each image captured at stage 610, an image to use for text recognition is selected. The image captured at stage 610 associated with the smallest magnitude value of M(t) is selected. In some configurations, the selected image must also be associated with a lower value of M(t) than a threshold value. If none of the values of M(t) are lower than the threshold value, method 600 can return to stage 610 to capture additional images and repeat the method.

At stage 650, text recognition is performed on the selected steady image. While stage 650 discusses text recognition, a selected steady image may be captured for some other reason. For example, a steady image of many other non-textual entities may be desired. For example, a steady image of a person, object, barcode, art, or location are only a few possible examples.

Figure 7:
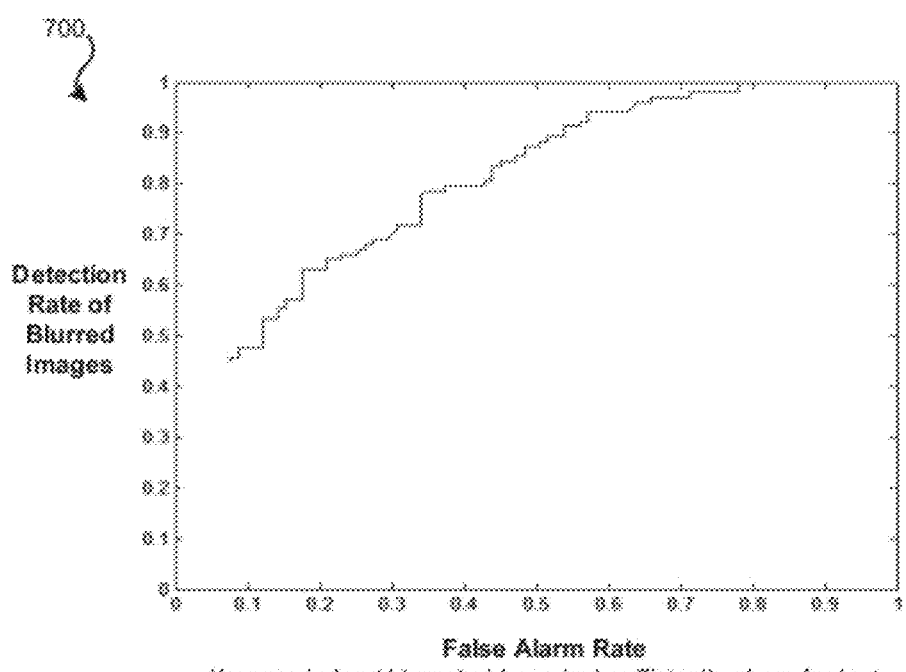
FIG. 7 is a plot of likelihood of a false alarm versus likelihood of detecting a blurred image.

The threshold value of M(t) used to determine whether an image is blurry or not may be adjusted such that greater or fewer images are identified as blurry. FIG. 7 illustrates a graph of the likelihood of a false alarm versus the likelihood of detecting blurred images. On the y-axis, the percentage of images determined to be blurred, that is, determined to have an M(t) value above a threshold, is graphed against the false alarm rate on the x-axis, that is, the percentage of images that are identified as blurry but are actually sufficiently sharp for successful text recognition. Therefore, as the threshold value is lowered and more images are determined to be blurred, the number of images that are sufficiently sharp for text recognition but are identified as blurry based upon the variance in acceleration of the image capture device also increases.

Figure 8:
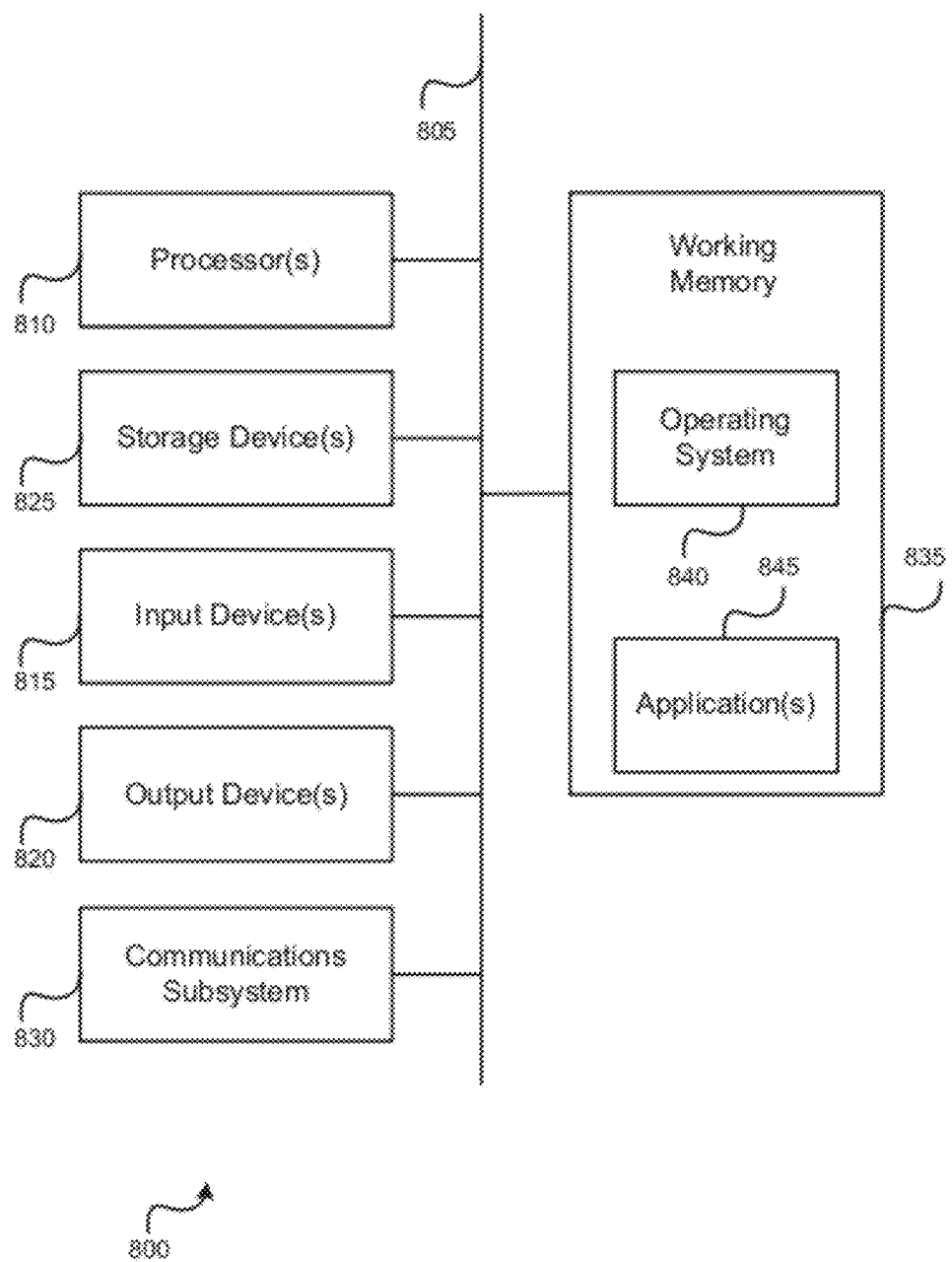
FIG. 8 illustrates a block diagram of an example of a computer system.

A computer system as illustrated in FIG. 8 may incorporate as part of the previously described computerized devices. FIG. 8 provides a schematic illustration of one embodiment of a computer system 800 that can perform the methods provided by various other embodiments, as described herein, and/or can function as the host computer system, a remote kiosk/terminal, a point-of-sale device, a mobile device, and/or a computer system. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805 (or may otherwise be in communication, as appropriate). The hardware elements may include one or more processors 810, including without limitation one or more general-purpose processors and/or one or more special-purpose processors (such as digital signal processing chips, graphics acceleration processors, and/or the like); one or more input devices 815, which can include without limitation a mouse, a keyboard and/or the like; and one or more output devices 820, which can include without limitation a display device, a printer and/or the like.

The computer system 800 may further include (and/or be in communication with) one or more non-transitory storage devices 825, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 800 might also include a communications subsystem 830, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 830 may permit data to be exchanged with a network (such as the network described below, to name one example), other computer systems, and/or any other devices described herein. In many embodiments, the computer system 800 will further comprise a working memory 835, which can include a RAM or ROM device, as described above.

The computer system 800 also can comprise software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 825 described above. In some cases, the storage medium might be incorporated within a computer system, such as the system 800. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 800) to perform methods in accordance with various embodiments of the invention. According to a set of embodiments, some or all of the procedures of such methods are performed by the computer system 800 in response to processor 810 executing one or more sequences of one or more instructions (which might be incorporated into the operating system 840 and/or other code, such as an application program 845) contained in the working memory 835. Such instructions may be read into the working memory 835 from another computer-readable medium, such as one or more of the storage device(s) 825. Merely by way of example, execution of the sequences of instructions contained in the working memory 835 might cause the processor(s) 810 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 800, various computer-readable media might be involved in providing instructions/code to processor(s) 810 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 825. Volatile media include, without limitation, dynamic memory, such as the working memory 835. Transmission media include, without limitation, coaxial cables, copper wire and fiber optics, including the wires that comprise the bus 805, as well as the various components of the communication subsystem 830 (and/or the media by which the communications subsystem 830 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800. These signals, which might be in the form of electromagnetic signals, acoustic signals, optical signals and/or the like, are all examples of carrier waves on which instructions can be encoded, in accordance with various embodiments of the invention.

The communications subsystem 830 (and/or components thereof) generally will receive the signals, and the bus 805 then might carry the signals (and/or the data, instructions, etc. carried by the signals) to the working memory 835, from which the processor(s) 805 retrieves and executes the instructions. The instructions received by the working memory 835 may optionally be stored on a storage device 825 either before or after execution by the processor(s) 810.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A system for recognizing text, the system comprising:
an image capture device configured to capture a plurality of images that each comprise text;
a movement measurement device configured to measure acceleration of the image capture device; and
a processor configured to:
determine, using the movement measurement device, a change of acceleration value associated with each image of the plurality of images, wherein:
each change of acceleration value represents a change in an amount of acceleration of the image capture device while a corresponding image of the plurality of images was being captured;
cause capturing of the plurality of images and determining of change of acceleration values associated with the plurality of images to occur until an image associated with a change of acceleration value below a predefined threshold change of acceleration value is determined; and
select the image to use for text recognition.

2. The system of claim 1, wherein the processor is further configured to perform text recognition on at least some of the text of the image.

3. The system of claim 1, wherein the processor is further configured to determine whether the image is desirable to use for text recognition.

4. The system of claim 1, wherein the processor, the image capture device, and the movement measurement device are part of a cellular phone.

5. The system of claim 1, wherein the image capture device is selected from a group consisting of:
a still camera; and
a video camera.

6. The system of claim 1, wherein the movement measurement device is selected from a group consisting of:
an accelerometer; and
a gyroscope.

7. The system of claim 1, wherein:
the movement measurement device is an acceleration measurement device; and
the change of movement values associated with each of the one or more images are variances of acceleration values.

8. A method for capturing sharper images, the method comprising:
capturing, by a computerized device, a plurality of images;
determining, by the computerized device, a change of acceleration value of the computerized device associated with each image of the plurality of images, wherein:
each change of acceleration value represents a change in an amount of acceleration of the computerized device while a corresponding one of the plurality of images was being captured;
capturing of the plurality of images and determining of change of acceleration values associated with the plurality of images occurs until an image associated with a change of acceleration value below a predefined threshold change of acceleration value is determined; and selecting, by the computerized device, the image to use for text recognition.

9. The method of claim 8, further comprising determining whether the image is desirable to use for text recognition, wherein the one or more images comprises text.

10. The method of claim 8, wherein the computerized device comprises an accelerometer.

11. The method of claim 8, wherein the computerized device is a cellular phone.

12. The method of claim 8, wherein the computerized device comprises an image capture device used to capture the plurality of images, the image capture device selected from a group consisting of:
- a still camera; and
- a video camera.

13. An apparatus for capturing a steady image, the apparatus comprising:
- means for capturing a plurality of images;
- means for detecting movement of the means for capturing the plurality of images;
- means for determining a change of movement value associated with each image of the plurality of images, wherein:
  - each change of acceleration value represents a change in an amount of acceleration of the means for capturing the plurality of images while a corresponding one of the plurality of images was being captured;
- means for causing capture of the plurality of images and determination of change of acceleration values associated with the plurality of images to occur until an image associated with a change of acceleration value below a predefined threshold change of acceleration value is determined; and
- means for selecting the image to use for text recognition.

14. The apparatus of claim 13, further comprising means for performing text recognition on text of the image.

15. The apparatus of claim 13, wherein:
while the image capture device is capturing each image of the one or more images, a person is holding the means for capturing the one or more images and the person is attempting to hold the means for capturing the one or more images stationary.

16. A computer program product residing on a non-transitory processor-readable medium and comprising processor-readable instructions configured to cause a processor to:
- induce a plurality of images to be captured;
- determine a change of acceleration value associated with each image of the plurality images, wherein:
  - each change of acceleration value represents a change in an amount of acceleration of an image capture device while a corresponding one of the plurality images was being captured by the image capture device;
- cause capturing of the plurality of images and determining of change of acceleration values associated with the plurality of images to occur until an image associated with a change of acceleration value below a predefined threshold change of acceleration value is determined; and
- select the image.

17. The computer program product of claim 16, further comprising processor-readable instructions configured to cause the processor to perform text recognition on text of the image.

18. The computer program product of claim 16, further comprising processor-readable instructions configured to use acceleration measurements to determine each change of acceleration value associated with each image of the one or more images.

* * * * *